United States Patent [19]
Rao et al.

[11] Patent Number: 5,169,734
[45] Date of Patent: Dec. 8, 1992

[54] ANTIMONY - ARSENIC-TIN-SELENIUM LEAD-BASED STRAP ALLOYS FOR LEAD-ACID BATTERIES

[75] Inventors: Purushothama Rao, Eagan; Steven R. Larsen, Oakdale, both of Minn.

[73] Assignee: GNB Incorporated, Mendota Heights, Minn.

[21] Appl. No.: 675,290

[22] Filed: Mar. 26, 1991

[51] Int. Cl.$^5$ .............................................. H01M 2/28
[52] U.S. Cl. .................................... 429/160; 420/569
[58] Field of Search ....................... 429/160, 158, 161; 420/569

[56] References Cited
U.S. PATENT DOCUMENTS 3,764,386 10/1973 Mix .................................. 429/161
3,801,310 4/1974 Nijhawan .......................... 420/569 X
3,912,537 10/1975 Peters ................................ 420/569 X
3,990,893 11/1976 Nijhawan et al. ................. 420/569 X
4,159,908 7/1979 Rao et al. ......................... 420/569 X

*Primary Examiner*—Stephen Kalafut
*Attorney, Agent, or Firm*—Leydig, Voit & Mayer

[57] ABSTRACT

Automotive SLI lead-acid batteries are disclosed which are characterized by enhanced resistance to intercell connection corrosion, even when exposed to the current, relatively high under-the-hood service temperatures in use with recent model automobiles. The straps are formed from a lead-based alloy including from about 3.0 to 3.3% antimony, from about 0.04 to 0.07% tin, from about 0.04 to 0.07% arsenic and from about 0.014 to 0.020% selenium, the percentages being based upon the weight of the alloy.

2 Claims, 5 Drawing Sheets

ANTIMONY - ARSENIC-TIN-SELENIUM LEAD-BASED STRAP ALLOYS FOR LEAD-ACID BATTERIES

This invention relates to lead-acid batteries, and, more particularly, to alloys for use in making the plate straps and intercell connections in such batteries.

BACKGROUND OF THE INVENTION

Over the last fifteen to twenty years or so, there has been substantial interest in automotive-type, lead-acid batteries which require, once in service, little or no further maintenance throughout the expected life of the battery. This type of battery, often termed a "maintenance free battery", was first commercially introduced in 1972 and is currently in widespread use.

There has been a considerable amount of attention addressed to the type of alloys used in maintenance-free batteries. When the maintenance-free batteries were first commercially introduced, conventional automotive lead-acid batteries commonly used grids formed from antimony-lead alloys in which the antimony content ranged from about 3-4.5% by weight of the alloy composition. Such alloy compositions were capable of being formed into battery grids by gravity casting techniques widely used in the 1970's. Moreover, the batteries made using grids of those alloy compositions had desirable deep discharge cycling characteristics.

Unfortunately, such high antimony content lead alloys could not be used for grids for maintenance-free batteries. The use of such alloys resulted in batteries having undesirable gassing characteristics. In other words, grids made from such alloys accepted an excessive current during constant voltage overcharge so that excessive gas generation occurred. Accompanying this gas generation was the loss of water from the sulfuric acid electrolyte. Much commercial interest for alloys for maintenance-free batteries centered around calcium-tin-lead alloys and "low antimony" lead alloys—i.e., the antimony contents in such alloys being in a range of about 1-2% by weight or so.

In conventional lead-acid battery construction, a strap is cast onto the lugs located on the battery plates to electrically connect the plates of the same polarity together. This cast strap typically includes a portion, often termed a "tombstone" because of its shape, which is positioned adjacent to an aperture in the battery container cell partition. Adjacent tombstones and associated straps which connect plates of opposite polarity are initially assembled on either side of the aperture and are then welded to form an intercell weld in a through-the-cell partition configuration. This intercell weld then serves as the current path from one cell of the battery to the adjacent cell. As used herein, the term "strap" or "battery strap" refers to the strap connecting the lugs of the respective battery plates as well as the portion used to form the intercell connection.

Whether the lead-acid batteries were of a maintenance-free type or not, the intercell connection has been of substantial concern to battery manufacturers. Thus, a considerable amount of technology has developed over the years in an effort to provide a reliable, through-the-cell intercell connection.

One type of technology has been termed an "extrusion-fusion" welding process. In this process, the tombstone is first extruded under cold flow conditions into the aperture in the cell partition. The extruded portions are then fused using electrical resistance heating. Many other techniques are known for forming the intercell connections, among these being processes in which the intercell weld is created principally or solely by fusion.

Crucial to any of the processes by which the intercell connection is made is the need to have an electrolyte-tight seal between the portion of the strap forming the tombstone and the partition wall. Such a tight seal is needed for many reasons. It is thus desired to prevent any path for electrolyte from one cell to another that would create, in effect, a minor short-circuit path. Without cell-to-cell electrolyte isolation which would be compromised by even a minor short circuit path, the desired and correct maintenance of the battery voltage is likewise compromised. Additionally, and importantly, when intercell welds corrode and fail, the potentiality for explosions exists as is well known.

Maintaining the electrolyte-tight seal throughout a satisfactory battery service life is quite difficult. Thus, the intercell weld is typically submerged to some extent in the electrolyte. Accordingly, intercell corrosion problems can become a significant concern.

It is, of course, well recognized that lead-acid batteries are perishable products. Eventually, such batteries will fail; and there are several possible failure modes, e.g.—due to positive grid corrosion. The thrust of maintenance-free batteries has been to forestall the failure in performance for a period of time commensurate with the expected life of the battery, e.g.—three to five years or so. However, for the reasons evident from the foregoing, it is highly desirable, if not perhaps essential, to have the eventual failure mode be other than failure due to faulty intercell connections.

In the past few years, there have been several factors which have complicated the situation. One is seemingly ever-increasing power and energy requirements for SLI automotive batteries. Many factors have contributed to the need and/or desire for batteries having more power.

Yet another complicating factor is the "under-the-hood" space requirements. Automobile manufacturers have lessened the space available for the batteries. Typically, it has become necessary to provide lower profile batteries—i.e., batteries having a less overall height than previously used.

These complicating factors of increasing power and less available space have required battery manufacturers to alter the internal configuration and designs to provide the power and energy needed in the desired low profile container. This has typically involved increasing the number of plates per cell and decreasing the thickness of the battery grids. For example, the number of plates in a BCI Group 24 battery over the past few years has increased from about 13 to about 19 or so, while the thickness of the positive grids has decreased from about 70-75 mils down to 55 mils, and even 45 mils or so. This has allowed battery manufacturers to provide batteries having relatively high rated capacities.

What has also occurred in the recent years for various reasons is a substantial increase in the vehicle under-the-hood temperature to which an automotive SLI battery is exposed. This increased temperature obviously presents a particularly acute situation in the warmer climates. One battery manufacturer has perceived that, in the past three years or so, the temperature in such warmer climates to which an SLI battery in service is exposed has risen from about 125° F. to about 165° F. in new automobiles.

The specific temperature increase to which SLI batteries are now exposed is not per se of particular importance. What is important is that the under-the-hood temperatures have in fact increased. The impact of this rise in vehicle under-the-hood temperatures on the failure modes and the timing of such failures has been substantial. The incidence of premature battery failure due to failure of intercell welds has been significant. The industry has failed to appreciate the impact of all of these complicating factors on current maintenance-free battery designs and their performance and useful service life.

One attempt to deal with the acute problem of the high under-the-hood temperatures has been to retrench. Thus, one automotive battery manufacturer has developed a battery specifically directed for use in high heat environments in which thicker positive grids are used, less plates per cell are used and the head space in each cell is filled with hollow plastic microspheres. The presence of such microspheres may perhaps be perceived to function as a vapor barrier to electrolyte to minimize evaporative loss of water in the electrolyte or for limiting heat transfer or for perhaps some other purpose.

A wide variety of strap alloys have been used over the years in maintenance-free and in other SLI battery applications. More typically, these lead-based alloys include antimony, arsenic and tin in a wide variety of levels together with other alloying ingredients such as copper, sulfur and selenium. Typically, the antimony content has ranged from about 2.7 to about 3.4% by weight of the total alloy. One prior alloy of this general antimony content also included, arsenic in the range of 0.13-0.2%, tin in the range of 0.3-0.4% and selenium in the range of 0.013-0.02%. Another antimony-lead alloy of this type also included arsenic in the range of 0.16-0.19%, tin in the range of 0.14-0.16% with copper in the range of 0.05-0.06% and sulfur in the range of 0.0007-0.0017%. Still another antimony-lead alloy used in an SLI automotive battery included arsenic at a level of 0.07%, tin at 0.06% and copper at 0.037%. Lastly, still another strap alloy of this type used in an SLI automotive battery included arsenic at a level of 0.005%, tin at a content of 0.005%, selenium at 0.008%, copper at 0.003% and sulfur at 0.0006%.

In view of the complicated situation during service which has caused a significant increase in premature battery failures due to faulty intercell welds, there is a substantial need for a solution that will provide automotive SLI batteries for recent model automobiles which are capable of performing even in the warmer climates with satisfactory service lives.

It is accordingly an object of the present invention to provide a maintenance-free, lead-acid battery capable of satisfactory service life even when exposed to the relatively high temperature under-the-hood environment in recent model automobiles.

Another and more specific object lies in the provision of an alloy composition that may be used for making the straps for such maintenance-free batteries.

A still further object provides a strap alloy for such batteries that imparts to the batteries enhanced resistance to corrosion in comparison to alloys presently being used.

Yet, another object of the present invention is to provide an SLI automotive lead-acid battery in which the eventual principal battery failure mode is a mode other than faulty intercell welds.

Other objects and advantages of the present invention will be apparent as the following description proceeds, taken in conjunction with the accompanying drawings.

SUMMARY OF THE INVENTION

The invention is predicated on the discovery that a major failure mode of intercell welds is due to the buildup of a corrosion layer, believed to be at least principally of lead sulfate. The corrosion process is a natural occurrence in a lead-acid battery; and the rate of this corrosion is greatly influenced by battery service temperature, grid chemistry and method of strap production, and strap alloy chemistry, among other factors. It is the intent of the battery designer to restrict the corrosion rate to an acceptable, controlled rate so that the intercell connections of the battery do not fail prematurely in service.

In conjunction with the present invention, it has been now discovered that a corrosion layer builds up on the tombstone face between the cell partition wall and the adjacent tombstone face of the intercell weld. This buildup occurs on the tombstone face on both positive and negative polarity tombstones of the adjoining cells. As the buildup occurs, the corrosion layer is believed to function as a wedge, forcing the face of the weld out of electrolyte-tight contact with the cell partition. This wedging action causes stress fractures or cracks and propagates such fractures and cracks through the intercell weld, ultimately leading to failure of the intercell connection.

In view of this wedging action, it has been discovered that the strap alloy employed must impart to the resulting intercell weld a unique set of mechanical properties for the intercell weld to survive the high temperature conditions which are present in current automobiles when operated in the warmer climates. More specifically, it has been found that the strap alloy used to make the intercell connection must impart to the resulting intercell weld adequately high toughness while having satisfactory ductility.

Pursuant to this invention, it has been discovered that a lead-based alloy that will impart to an intercell weld these desired mechanical characteristics can be formed from the following composition, all of the percentages being based upon the total weight of the lead alloy: antimony in the range of from about 3.0-3.3% or so, arsenic in the range of from about 0.04 to 0.07% or so, tin in the range of from about 0.04 to 0.07%, and selenium in the range of from about 0.014 to 0.02%. The changes in the composition of alloys of this type from those previously used may appear superficially to be somewhat subtle, but these changes impart substantially different results in terms of corrosion resistance in actual service life, as will be discussed in greater detail hereinafter.

While the invention is susceptible of various modifications and alternative forms, specific embodiments thereof will hereinafter be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

DETAILED DESCRIPTION OF THE PREFERRED EMBODIMENTS

Figure 1:
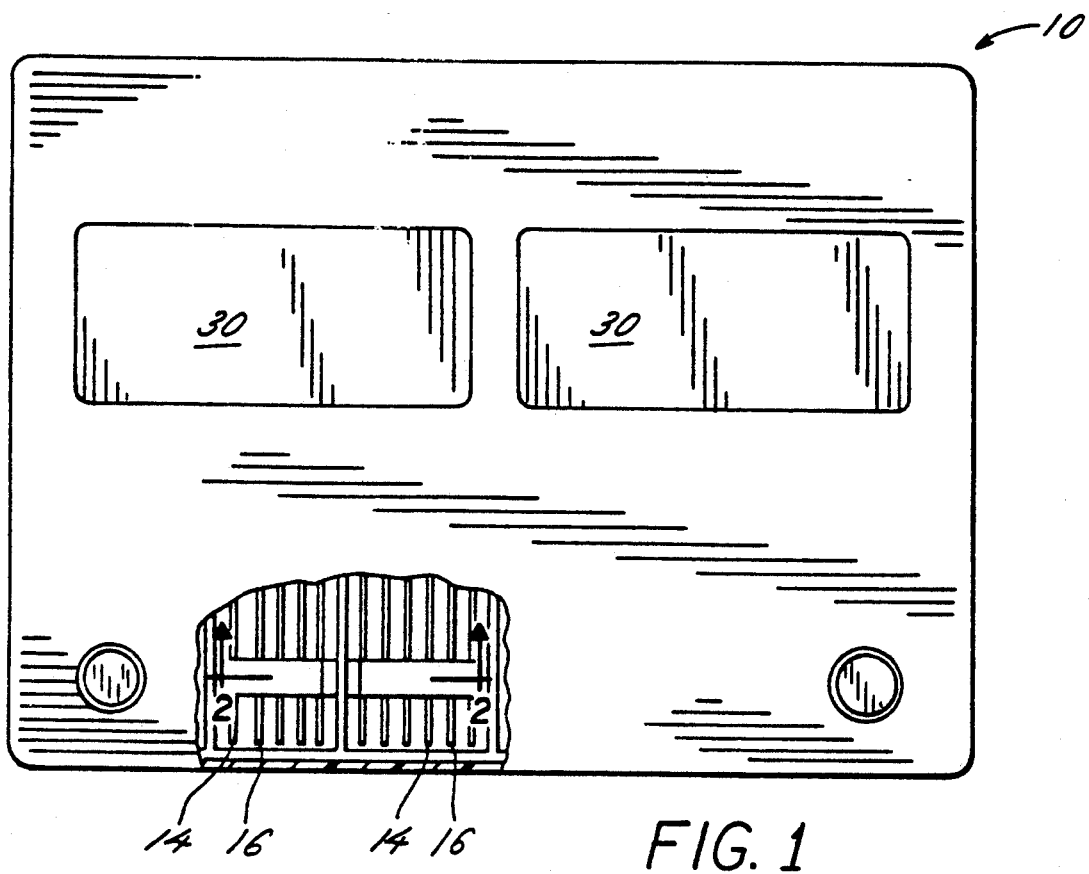
FIG. 1 is a top plan view of a maintenance-free battery in accordance with the present invention and is partly cut-away to show the interior.

Turning now to FIG. 1, there is shown a maintenance-free battery utilizing the unique strap alloy composition of this invention. Thus, a maintenance-free battery 10 is shown which includes a container a pair of terminal posts and a cover sealed to the container by any conventional means. The container is divided into a plurality of cells and a battery element is disposed in each of the cells. This element includes positive grids 14 and negative grids 16. The electrodes, as is conventional, include a supporting grid structure having an integral lug 17, a layer of active material attached thereto and a strap joining the lugs 17 of the respective positive and negative grid structures together.

The intercell connection is shown generally at 20 and includes opposing tombstones 22 in electrolyte-tight contact with the cell partition 24. The aperture 26 in the cell partition 24 has fused portion 28 that forms the cell-to-cell connection through aperture 26. The terminal posts are similarly electrically connected through strap 18 to the battery plates. Suitable venting means for allowing evolved gases to escape are shown at 30.

While any alloys may be used to form the positive grids, it is preferred to utilize the low calcium-tin-silver lead alloys disclosed in the Rao application identified herein. The use of such alloys imparts to the resulting battery enhanced resistance to positive grid corrosion, particularly when the battery is exposed to the relatively high under-the-hood temperatures of current automobiles in warmer climates.

The negative grids may be formed from any alloy composition desired, and there are a wide variety of such alloy compositions which have been used in maintenance-free applications. Typically, it will be more preferred to utilize antimony-free, lead-based alloys. Particularly suitable are the calcium-tin-lead alloys in widespread use.

Figure 2:
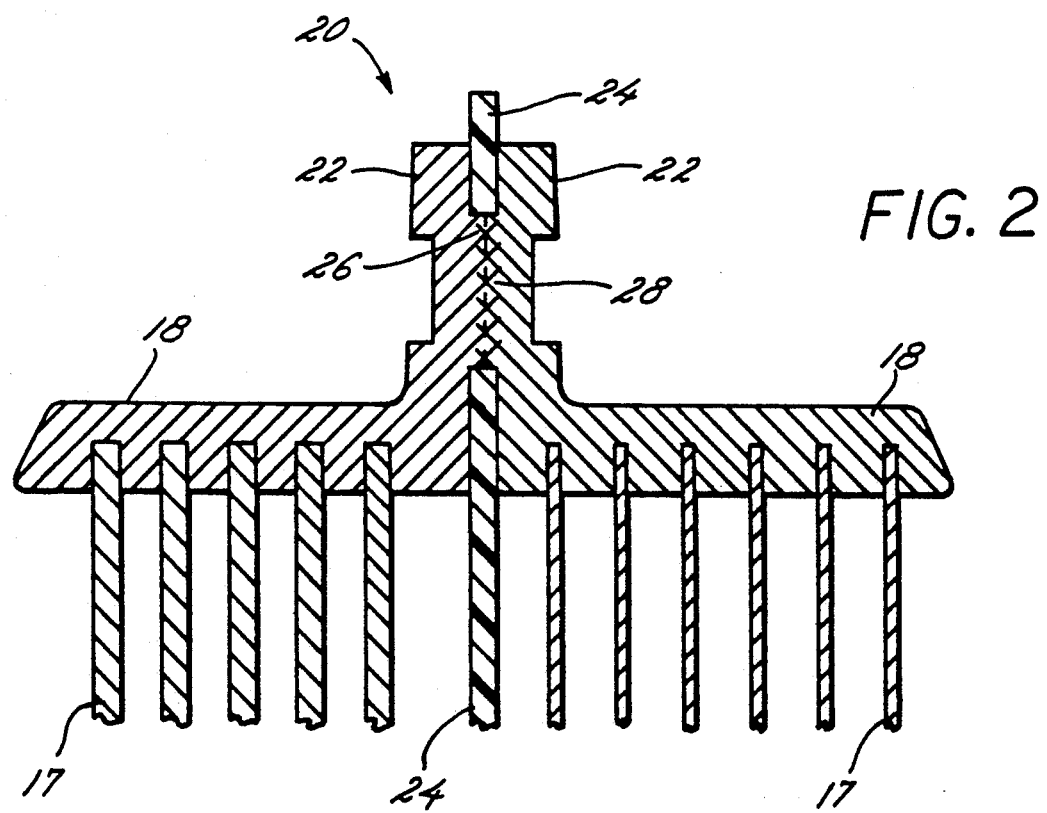
FIG. 2 is a cross-sectional view taken generally along the line 2—2 of FIG. 1 and illustrating the strap and intercell connection utilized.

The particular construction of the battery generally shown in FIGS. 1 and 2 may be varied as desired for the intended application. The strap alloys used in the present invention thus may be advantageously employed in any type of lead-acid batteries. For example, in addition to the top terminal battery illustrated herein, the strap alloys of this invention may be desirably used in dual terminal batteries, such as are shown and described in U.S. Pat. No. 4,645,725. Similarly, these strap alloys may be used in side terminal lead-acid batteries.

As to the intercell connection shown in FIG. 2, this connection can be formed by any of the several intercell welding or forming techniques that are well known in this field. These known processes include both fusion and extrusion-fusion processes. When an extrusion-fusion process is used, it will be more desirable to allow for uniform cooling so as to provide a uniform microstructure throughout the weld. The ability to provide such welds is well-known in the art.

In accordance with one aspect of the present invention, it has been found that a principal mode of intercell weld failure is due to a corrosion layer that builds up, causing stress fractures and cracks which can propagate throughout the intercell weld, resulting in weld failure during use of the battery. More particularly, it has been found that, during battery service life, a corrosion layer, believed to be at least principally of a lead sulfate composition, builds up on the faces of the tombstones between the planar surfaces of the cell partition 24 and the partition-facing portions of the tombstones 22 adjacent to the cell partition 24.

Figure 3:
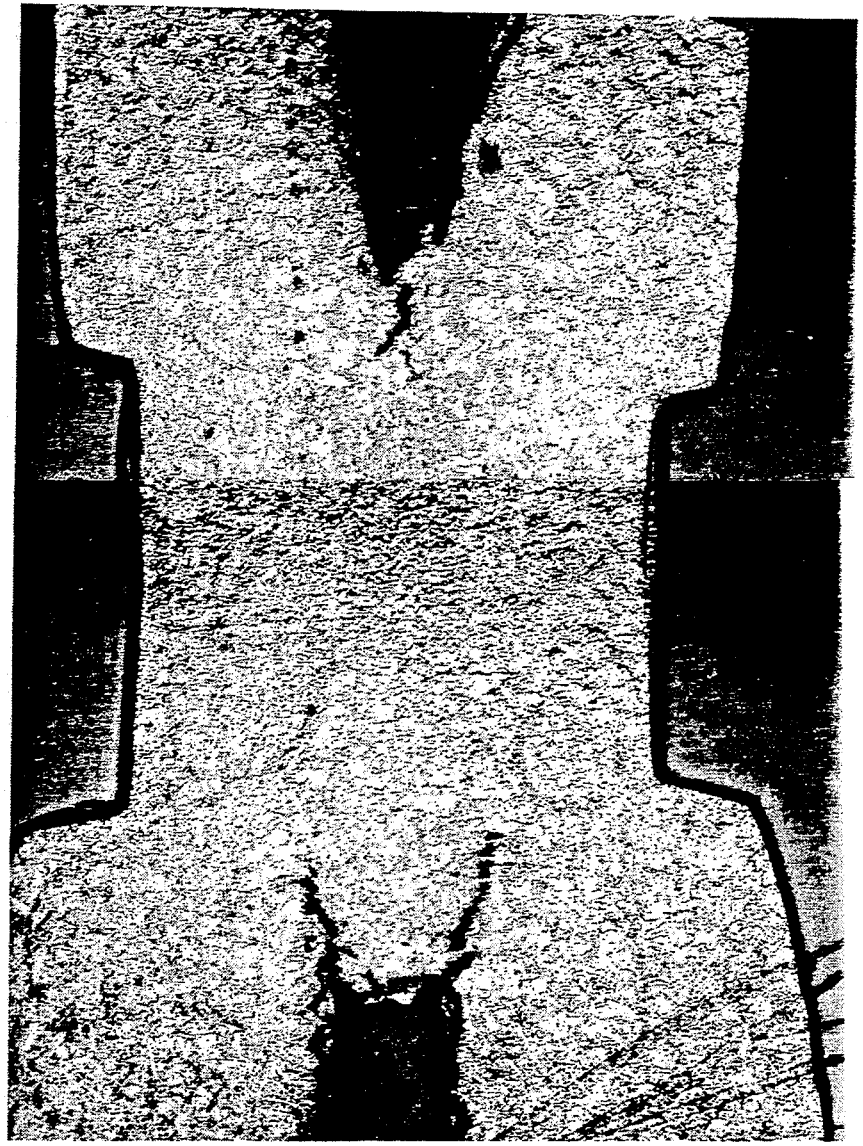
FIGS. 3 and 4 are photomicrographs, at 10.5× amplification showing an intercell weld made with a previously used strap alloy from a battery subjected to exposure in a 155° F. environment for sixteen and nineteen weeks, respectively.
Figure 4:

This corrosion layer is believed to function like a growing wedge tending to separate the tombstone from its electrolyte-tight contact with the cell partition. This buildup can occur quite quickly at high temperature conditions. Thus, FIGS. 3 and 4 show photomicrographs of an intercell weld in a maintenance-free battery which has been continuously exposed to temperature of 155° F. for sixteen and nineteen weeks, respectively. As can be seen, the exposure to these high temperatures has resulted in cracks propagating both from the portion adjacent the bottom of the cell partition as well as the top. Such cracks can ultimately lead to failure of the intercell weld.

The intercell connection failure mode observed in batteries subjected to continuous 155° F. exposure (sometimes termed "hot box" exposure) has been found to be very similar to the intercell connection failures observed in batteries removed from vehicle service due to premature failure. Accordingly, this hot box exposure is considered to provide an accelerated and reliable laboratory test to prove the adequacy, and a method for evaluating the integrity, of the intercell connections in lead-acid batteries.

Satisfactory intercell connections should be capable of reliably withstanding the 155° F. hot box exposure for at least 15 weeks without the appearance of cracks visible in photomicrographs at 10.5× amplification. More preferably, intercell connections should be capable of reliably withstanding at least 20 weeks of hot box exposure at 155° F. By "reliably withstanding" such exposures, it is meant that essentially all of the intercell connections will not show cracks in essentially all of the batteries tested. Stated differently, out of 100 batteries tested, there should be no more than one battery or so that fails through a faulty intercell weld due to intercell corrosion.

To this end, the strap alloys of the present invention comprise antimony-arsenic-tin-selenium lead-based alloys that possess a unique combination of toughness and ductility that allow intercell connections formed from such alloys to reliably withstand 155° F. hot box exposure. Such alloys thus possess relatively high yield strength-ultimate tensile strength (i.e.—toughness) while exhibiting relatively high ductility (i.e.—elongation). Further, overaging and loss of ductility following aging are relatively small in comparison to other alloys of this type.

As an illustrative example, one evaluation of the strap alloys of this invention provide a yield strength which varied from 2000 p.s.i. at time zero to 3296 p.s.i. after 72 hours, an ultimate tensile strength that ranged from 5616 p.s.i. at time zero to 6352 p.s.i. after 72 hours and an elongation ranging from 27.5% at time zero to 24.5% after 72 hours. These results were obtained by using ASTM standard procedures. Yield strength was determined at 0.05% permanent deformation. What is considered significant is that the relatively high yield and ultimate tensile strengths are provided while still achieving a relatively high elongation that is not significantly lost upon aging.

In accordance with the present invention, it has been discovered that a lead-based alloy having the following composition will impart desirable enhanced corrosion resistance characteristics to battery straps and intercell connectors: antimony in the range of from about 3.0 to 3.3%, arsenic in the range of from about 0.04 to 0.07%, tin in the range of from about 0.04 to 0.07% and selenium in the range of from about 0.014 to 0.02%.

Straps made from alloys of this composition exhibit the highly desired combination of mechanical properties, particularly when exposed to relatively high temperatures. More particularly, straps made from these alloys exhibit the desired combination of toughness and ductility that will provide batteries with intercell connections that adequately withstand high temperature conditions in service.

Figure 5:
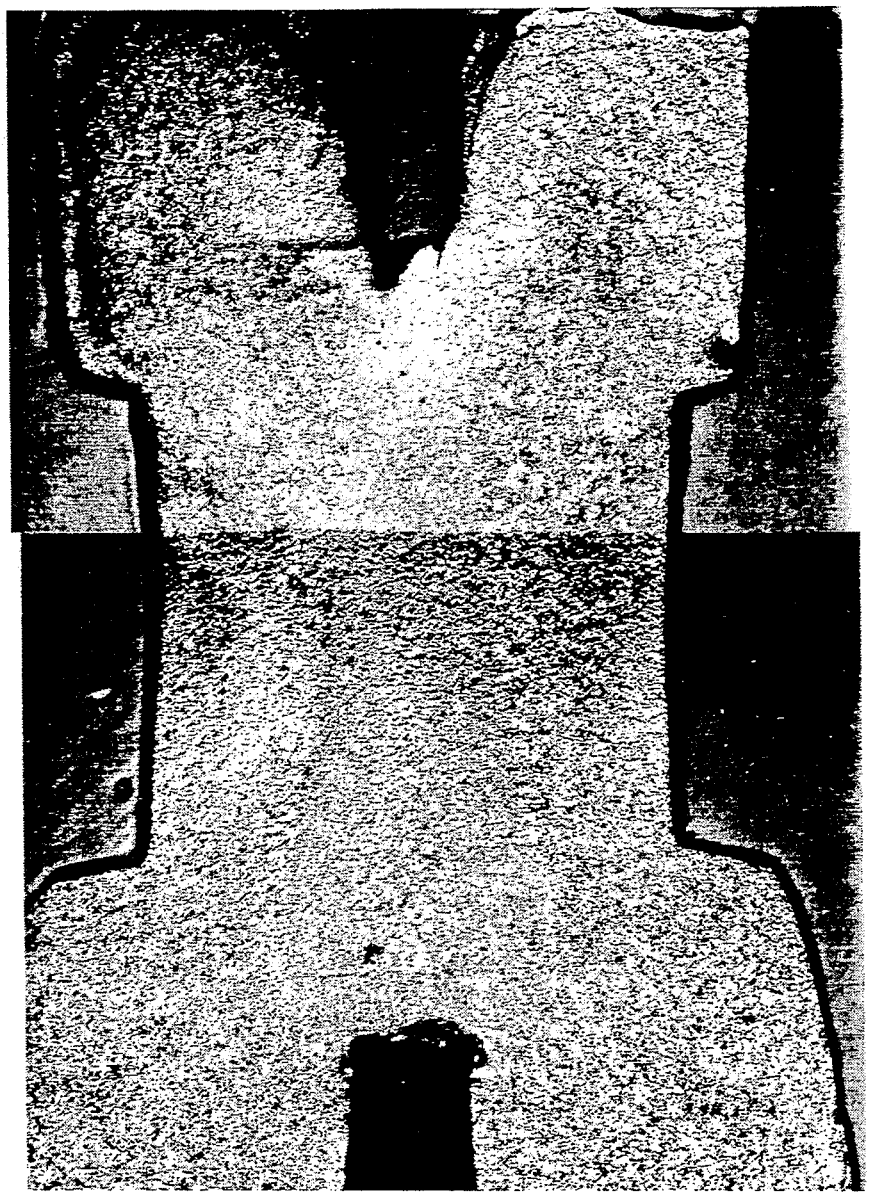
FIGS. 5 and 6 are photomicrographs comparable to FIGS. 3 and 4 but showing the intercell weld made with the strap alloy of the present invention after exposure of the battery to the 155° F. environment, also for sixteen and nineteen weeks respectively.
Figure 6:
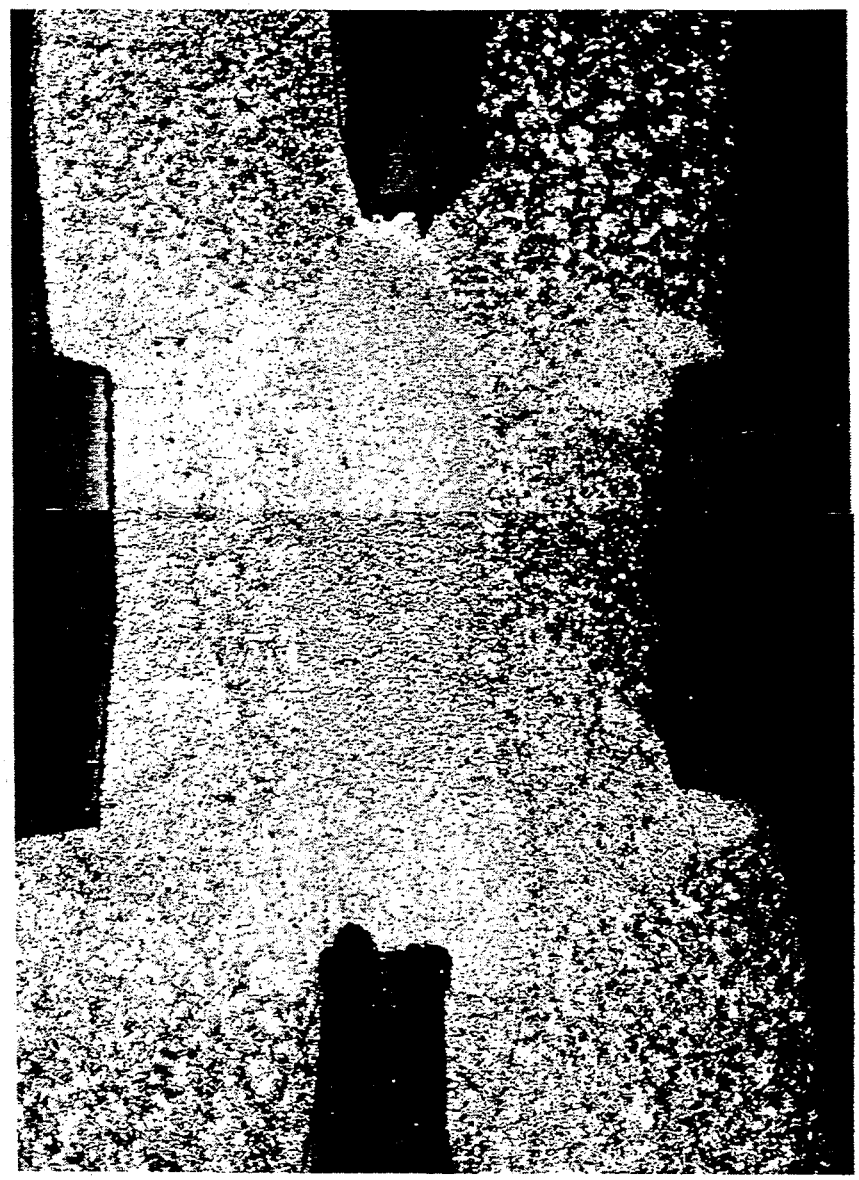

The effect of using the alloys of the present invention can be seen from the photomicrographs in FIGS. 5 and 6. The batteries made using the alloys of the present invention for the straps were continuously exposed, respectively, for sixteen and nineteen weeks to a temperature of 155° F. As can be seen by comparing the photomicrographs in FIGS. 5 and 6 with FIGS. 3 and 4, the straps using the alloys of the present invention are free from the corrosion stress fracture and cracks which have been initiated and propagated in previously used alloys.

Thus, as has been seen, the present invention provides strap alloys that allow batteries to successfully withstand the relatively high under-the-hood temperature conditions without enduring failure due to faulty intercell connections.

We claim:

1. An automotive SLI battery comprising a battery container having a plurality of cells and an electrolyte contained in the cells, each cell having a plurality of positive and negative electrodes disposed therein comprising a grid supporting structure having a layer of active material attached thereto, and a strap connecting the appropriate electrodes together, said strap including an intercell connection, said strap being formed of a lead-based alloy consisting essentially of lead, from about 3.0 to 3.3% antimony, from about 0.04 to 0.07% tin, from about 0.04 to 0.07% arsenic and from about 0.014 to 0.020% selenium, the percentages being based upon the weight of the alloy.

2. An automotive SLI lead-acid battery comprising a battery container having a plurality of cells and an electrolyte contained in the cells, each cell having a plurality of positive and negative electrodes disposed therein comprising a grid supporting structure and a lead-based alloy strap connecting the appropriate electrodes together, said strap including an intercell connection, said strap being capable of reliably withstanding continuous exposure to 155° F. for at least 15 weeks.

* * * * *